United States Patent
Jensen et al.

(10) Patent No.: US 10,249,000 B2
(45) Date of Patent: *Apr. 2, 2019

(54) SYSTEM AND METHOD FOR ADAPTIVE INFORMATION DISSEMINATION

(71) Applicant: Nasdaq Technology AB, Stockholm (SE)

(72) Inventors: Daniel Jensen, Stockholm (SE); Ulf Ahlenius, Bromma (SE); Anne Von Corswant, Bromma (SE)

(73) Assignee: Nasdaq Technology AB, Stockholm (SE)

( * ) Notice: Subject to any disclaimer, the term of this patent is extended or adjusted under 35 U.S.C. 154(b) by 481 days.

This patent is subject to a terminal disclaimer.

(21) Appl. No.: 14/465,866

(22) Filed: Aug. 22, 2014

(65) Prior Publication Data

US 2014/0365352 A1 Dec. 11, 2014

Related U.S. Application Data

(63) Continuation of application No. 11/641,955, filed on Dec. 20, 2006, now Pat. No. 8,843,592.

(51) Int. Cl.
*G06Q 40/04* (2012.01)
*G06Q 40/06* (2012.01)
*H04L 12/58* (2006.01)

(52) U.S. Cl.
CPC ............. *G06Q 40/04* (2013.01); *G06Q 40/06* (2013.01); *H04L 51/08* (2013.01)

(58) Field of Classification Search
CPC ......... H04L 47/10; H04L 47/11; H04L 29/06; H04L 67/26; G06Q 40/04
See application file for complete search history.

(56) References Cited

U.S. PATENT DOCUMENTS

| 5,077,665 | A | 12/1991 | Silverman et al. |
| 6,154,766 | A | 11/2000 | Yost et al. |
| 6,816,456 | B1 | 11/2004 | Tse-Au |
| 7,743,135 | B2 | 6/2010 | Azuma |
| 2001/0044835 | A1* | 11/2001 | Schober ............. G06F 8/60 709/217 |

(Continued)

FOREIGN PATENT DOCUMENTS

| EP | 1 202 501 | 5/2002 |
| EP | 1 633 092 A1 | 3/2006 |

(Continued)

OTHER PUBLICATIONS

Orly Kremien and Jeff Kramer, "Methodical Analysis of Adaptive Load Sharing Algorithms," IEEE Transactions on Parallel and Distributed Systems, vol. 3, No. 6, pp. 747-760 (Nov. 1992).*

(Continued)

*Primary Examiner* — Virpi H Kanervo

(74) *Attorney, Agent, or Firm* — Nixon & Vanderhye P.C.

(57) ABSTRACT

In a distributed network, there are different data rates on different connections between a central computer system and remote terminal. The central computer system includes one or more sets of data to be distributed to the remote terminals by extracting subsets of data from the set(s) of data. The subsets of data are distributed to selected groups of remote terminals based on an infrastructure load in order to adaptively distribute the data.

12 Claims, 3 Drawing Sheets

(56) References Cited

U.S. PATENT DOCUMENTS

| | | |
|---|---|---|
| 2003/0110280 A1 | 6/2003 | Hinchliffe et al. |
| 2003/0231648 A1 | 12/2003 | Tang et al. |
| 2004/0090959 A1 | 5/2004 | Cinghita et al. |
| 2004/0253991 A1 | 12/2004 | Azuma |
| 2005/0188112 A1 | 8/2005 | Desai et al. |
| 2005/0273421 A1 | 12/2005 | Rosenthal et al. |
| 2006/0080267 A1 | 4/2006 | Nelken |
| 2006/0227632 A1* | 10/2006 | Koyama ........... G06F 17/30038 365/200 |
| 2006/0294228 A1* | 12/2006 | Almstrom .............. G06Q 40/04 709/224 |
| 2007/0113113 A1* | 5/2007 | Sauer .................... G06F 1/3203 713/322 |
| 2007/0116151 A1* | 5/2007 | Thesling ............ H04B 7/18543 375/326 |
| 2007/0150605 A1* | 6/2007 | Christoffersson .... H04Q 3/0091 709/228 |

FOREIGN PATENT DOCUMENTS

| | | |
|---|---|---|
| GB | 2 395 408 | 5/2004 |
| GB | 2 411 492 | 8/2005 |
| JP | H11-003266 | 1/1999 |
| JP | 2004-259163 | 4/2004 |
| JP | 2004146881 | 5/2004 |
| WO | WO 01/89176 A2 | 11/2001 |
| WO | 2004/008309 | 1/2004 |
| WO | WO 2005/055002 A2 | 6/2005 |
| WO | 2005/083603 | 9/2005 |

OTHER PUBLICATIONS

Tak W. Yan and Hector Garcia-Molina, "The SIFT Information Dissemination System," ACM Transactions on Database Systems, vol. 24, No. 4, pp. 529-565 (Dec. 1999).*

Patrick T. Eugster et al., "Epidemic Information Dissemination in Distributed Systems," Computer, pp. 60-67 (May 2004).*

Summary of Japanese official action, dated Mar. 2, 2012, in corresponding Chinese Application No. 2009-542016.

International Search Report issued for International Patent Application No. PCT/EP2007/064003, dated Apr. 4, 2008.

* cited by examiner

| MBO |
|---|
| 5@100 |
| 4@100 |
| 2@100 |
| 7@100 |
| 9@101 |
| 10@102 |
| 10@102 |

| MBP |
|---|
| 18@100 |
| 9@101 |
| 20@102 |

| MBI | |
|---|---|
| 5@100 | ⎫ |
| 4@100 | ⎬ 3 MBO |
| 2@100 | ⎭ rest MBP |
| 7@100 | |
| 9@101 | |
| 20@102 | |

SYSTEM AND METHOD FOR ADAPTIVE INFORMATION DISSEMINATION

This application is a continuation of U.S. patent application Ser. No. 11/641,955, filed Dec. 20, 2006, the entire contents of which are hereby incorporated by reference in this application.

TECHNICAL FIELD

The present invention relates to distribution of data in computer systems. In particular it relates to adaptive data dissemination in high performance trading systems.

BACKGROUND

Today it is very common that information is sent over computer networks. The amount of information being sent is rapidly increasing due to the advances in technology, making it possible to send and process more information at higher speed. Furthermore, new applications also demand more information since they have become more complex. An example of computer systems where information dissemination is essential is electronic trading systems.

Electronic trading of securities, derivatives, commodities, and other financial instruments results in a large amount of information which has to be distributed to users that need the information for making trade decisions, statistical calculations, and other assessments.

A single order update can affect many different message flows that are generated by such a system. For example, a trading system that continuously provides their users with BBO (Best Bid Offer), VWAP (Volume Weighted Average Price), MBO (Market By Order) and MBP (Market by Price) messages will need to generate four new messages for each received order that affects the best price point (three messages if the order is on a different price point). In other words this type of system will generate four messages for every incoming order message. In a high performance trading system that shall be able to handle several thousand order book changes per second, the 1-to-4 ratio above becomes a problem. Real trading systems will also most likely have several more message flows to generate than just the four mentioned above. The generation of such messages will cause performance issues on the central system as well as bandwidth utilizations issues on the network that are used within the system community.

Furthermore the users connected to such a centralised trading system typically want to have the information as soon as possible. In these cases it may not be enough to just boost the performance in the central system by for example updating the hardware. In order to get rid of a bottleneck or other latency problem in the system additional techniques may have to be used.

Usually these bottlenecks end up between the user side and central system, since the users have limited possibilities to update their connection to the central system. Thus the connections between the central system and the remote terminal computers is a weak point when it comes to information dissemination.

An example of a system for providing electronic information is described in WO2005/083603 A1. This document describes a quality-of-service system, which subsystem is operative to impose limitations upon trading activities in order that the performance of a component of the system or of the system as a whole is maintained within specified tolerances. For example it may limit the access to the central system by limiting the number of events that can be initiated by a trader.

But this prior art system has a number of drawbacks. One such drawback is that they limit the freedom of action for a user both for sending in and thereby executing their orders at a central system.

Another drawback in the traditional trading systems are that they often are very static. The systems do not consider that the amount of data from a trading system varies over time. There are peak sessions and there are low activity sessions that produces different amount of information. Furthermore this can also vary among different securities. One security might be in a peak session while another security is in a low activity session.

Thus, configurations affect the entire trading day even though there are different requirements during different sessions. Furthermore, the granularities of the configurations are often so "rough" that they affect the entire system even though they might only be needed for one security.

SUMMARY

Thus it is an object to provide a solution for distributing the data in the most optimized way.

It is another object to making data available to remote terminals.

It is another object to provide a solution for adaptively distributing data.

It is another object to provide a solution for distributing the data based on an infrastructure load.

It is another object to provide a solution for distributing the data based on a system performance.

It is another object to provide a solution for distributing the data based on bandwidth utilization.

It is another object to provide a solution that distributes information without limiting the access to the central system.

It is another object to limit the amount of data generated by the system in order to protect the bandwidth.

According to a first aspect the above and other objects are achieved by providing a computer system for making available one or more data sets to a plurality of remote terminals via a network, the computer system comprising:
- a memory comprising a superset of data,
- a determiner for determining an infrastructure load,
- a control module associated with the memory, for extracting and distributing at least one data set, from the superset of sorted data, based on the infrastructure load.

The computer system has the advantage that it will make it possible for a central system such a trading system to automatically control the amount of data that is generated based on the current infrastructure load.

Furthermore the computer system has the advantages that the system makes it possible for remote terminals connected to the central system to obtain information as fast as possible, and at the same time making sure that the central system can receive orders from remote terminals such as from traders for example, by preferably limiting or managing the outgoing traffic from the central system.

Preferably the data set is extracted and/or distributed upon a change of the superset or upon a request by a remote terminal or upon a timer deadline such as by a hold-back timer deadline.

Infrastructure relates to everything that supports the flow and processing of data/information in a computer system. It can be divided in to two groups: hardware and software.

Example of infrastructure hardware and software are the interconnecting hardware (network), software, interfaces, protocols, front-end computers, back-end computers, the connections between the devices, operating systems, application programs and so forth.

Preferably the control module controls the extraction and distribution of data sets by controlling at least one of the following parameters:
the number of data sets,
the frequency of the data sets,
the content of the data sets, and
the type of data set, (for example how the data is distributed).

Thus, preferably the control module comprises a regulator for regulating the number of data sets. The regulator may regulate the number of data sets based on an input relating to an infrastructure load.

The input regarding infrastructure load may be obtained by a determiner measuring the data rate on a data connection, measuring the processor load at the central system. Furthermore the determiner may be a module (agent) at a remote terminal measuring the performance of the remote terminal and sending the information related to the application program to the central system. The determiner could also be a surveillance tool related to a bus such as an intelligent message bus with ability to measure current bandwidth situation at different locations. Hence the infrastructure load may be related to any activity in the market on an electronic exchange.

Furthermore the input could also be a subscription related to a remote terminal Thus the regulator may regulate the number of data sets based on a combination of data rate and subscription or based on one of them alone.

The control module may also comprise a holdback timer for controlling the frequency of the data sets. The controlling of frequency may also be based on an input as described above.

Furthermore the control module may comprise a sorter for controlling the content of the data sets. The controlling of the content of data sets may also be based on an input described above.

Even further the control module may comprise a classifier for controlling the type of the data sets. The type of data set means that it can either be sent as incremental changes such as delta changes, or as data elements of the subset. The type could also be a snapshot of the subset. Which type to send depends on the specific situation wherein the invention is to be used. For example it could be more bandwidth effective to send a snapshot when using a hold-back timer, then it also easier for the system to predict bandwidth utilization since the system knows how much and when the data will be sent.

Preferably the infrastructure load is chosen from a group of loads comprising:
bandwidth utilization, on a connection to a remote terminal computer or between other system devices,
latency, thus the time from sending a message to receiving an acknowledge. For example when sending in orders to a system or when sending the data sets to the remote terminals from the central system.
Performance, such as processor load at the central system, Disc I/O and so forth.

The control module may further comprise a communicator associated with the control module, for distributing the data sets to the plurality of remote terminals.

Preferably the data sets comprise at least a part of the superset of sorted data elements. Thus the data sets that is to be sent may comprise; all the corresponding data elements of the original data set (snapshot), or only to a few of the corresponding data elements of the original data set (data elements that have been changed), or only to parts of the corresponding data elements of the original data set (delta changes).

In a second aspect the above and other objects are achieved by an electronic exchange comprising the computer system as mentioned above.

The computer system may thus be an integrated module in an electronic exchange. It can also be a stand alone module that can be sold separately as an information dissemination system, such as a stand alone device.

In a third aspect, the above and other objects are fulfilled by a method implemented on a computer system for making available one or more data sets to a plurality of remote terminals via a network, the method comprising the steps of:
determining an infrastructure load,
extracting and distributing at least one data set, from the superset of sorted data, based on the infrastructure load.

The computer system has the advantage that it makes it possible for a central system such a trading system to automatically control the amount of data that is generated based on the infrastructure load.

Furthermore the method has the advantages that it makes it possible for everyone to obtain information as fast as possible, and at the same time making sure that the central system can receive orders from remote terminals such as traders for example.

The data set may be extracted and/or distributed upon a change of the superset or upon a request by a remote terminal or upon a timer deadline such as by a hold-back timer.

Preferably the method further comprises the step of extracting and distributing data sets by controlling at least one of the following parameters:
the number of data sets,
the frequency of the data sets,
the content of the data sets, and
the type of data sets.

Thus by controlling one of the above parameters the system is able to control the output of data based on an infrastructure load.

The infrastructure load is preferably chosen from a group of inputs comprising:
bandwidth utilization,
latency,
performance.

In this way the system adaptively disseminates information to remote terminal computers while at the same time keeping the bandwidth open for incoming orders. Thus it is implemented so that it continuously regulates the distribution of data sets based on the infrastructure load.

Preferably the bandwidth is open for incoming orders, thus the distribution of data sets is continuously regulated. However, in a situation during extremely heavy load on the system it may be necessary to also limit the incoming orders. Since one incoming order may result in four outgoing messages. By also regulating the incoming order it is possible to regulate the traffic of messages even more efficient.

In a fourth aspect, the above and other objects are fulfilled by a computer program product according to any of the previous aspects and/or embodiments, the computer program product being stored on a data carrier.

These and other aspects will be apparent from and elucidated with reference to the example embodiments described hereinafter.

DETAILED DESCRIPTION

The following section first presents some definitions and acronyms used in the document, and thereafter, a number of different methods will be explained. The methods are preferably used in relation to an electronic trading system to control bandwidth utilization and address performance issues that are caused by the great amount of market data that is generated by these types of systems. However, the technology described can be used in any central system wherein information dissemination is handled.

Furthermore the following section describes a solution that uses these methods in order to optimize information dissemination in a central or trading system based on the infrastructure load situation such as performance, latency, bandwidth utilization, and so forth. The presented solution is adaptive, and its behaviour is controlled based on the current infrastructure load situation.

Figure 1:
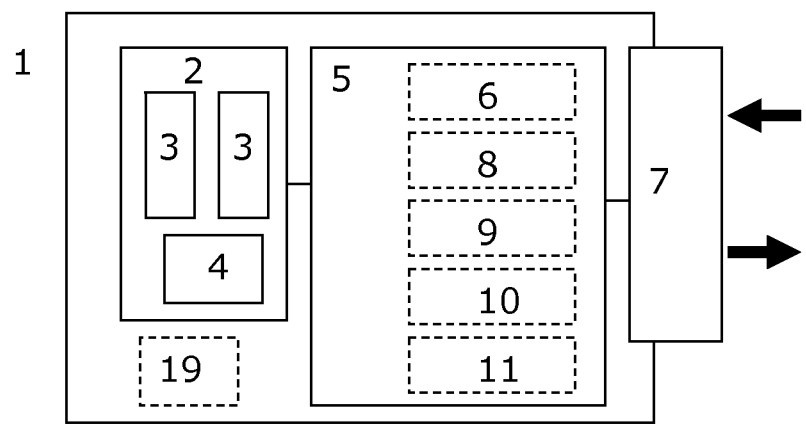
FIG. 1 illustrates a computer comprising a memory, a control module, a regulator, a sorter, a classifier, a communicator and an interface.

FIG. 1 illustrates an electronic device comprising the computer system 1. The computer system 1 comprises a memory 2, a superset or sorted data 3, a control module 5, a regulator 6, a holdback timer 8, a sorter 9, a classifier 10, a communicator 11, an interface 7, and a determiner 19. The memory 2 comprises two supersets 3 and an area for storing parameters 4.

Figure 2:
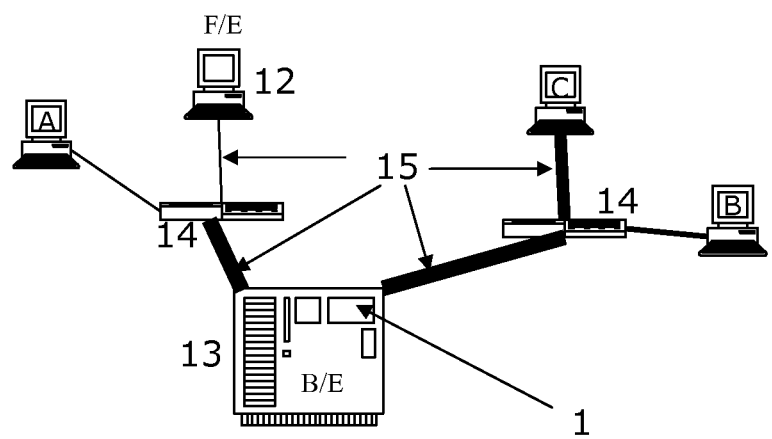
FIG. 2 illustrates an overview of a computer network having different data rates on the connections between the devices.

FIG. 2 illustrates a central computer system having front-end computers 12, a back-end system 13 and gateways or routers 14. Between the different devices there are connections illustrated by lines 15 having different thickness. The thickness illustrates the bandwidth (data rate). A thick line has a high data rate and a thin line has a low data rate. Three of the front end computers in FIG. 2 have a letter on the screen that illustrates that it is a remote terminal computer belonging to user A, B and C. The remote terminals may comprise the determiner 19 if the system 1 wants information from the remote terminals.

Figure 3:
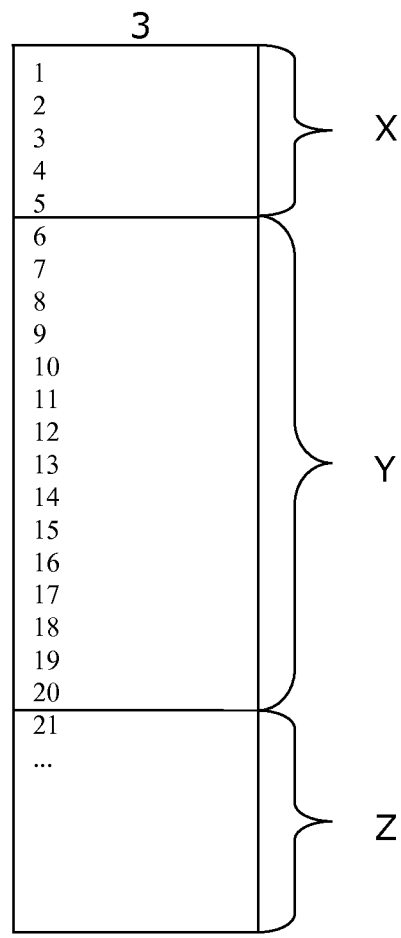
FIG. 3 illustrates an example embodiment of a superset of data and three subsets of data.

FIG. 3 illustrates a superset of data 3 which in this example is divided into three subsets of data X, Y, Z. The superset may be divided into more subsets each comprising less data elements or it may be divided into less subsets comprising more data elements. How many subsets that represent the superset is preferably decided based on each specific situation and system. In this document however we have chosen to divide the superset into three subsets as a simple illustration. The first subset 8 comprises five data elements (1-5); the second subset 9 comprises 15 data elements (6-20); and the third subset comprises the data elements >20, e.g., 21-30.

Figure 4:
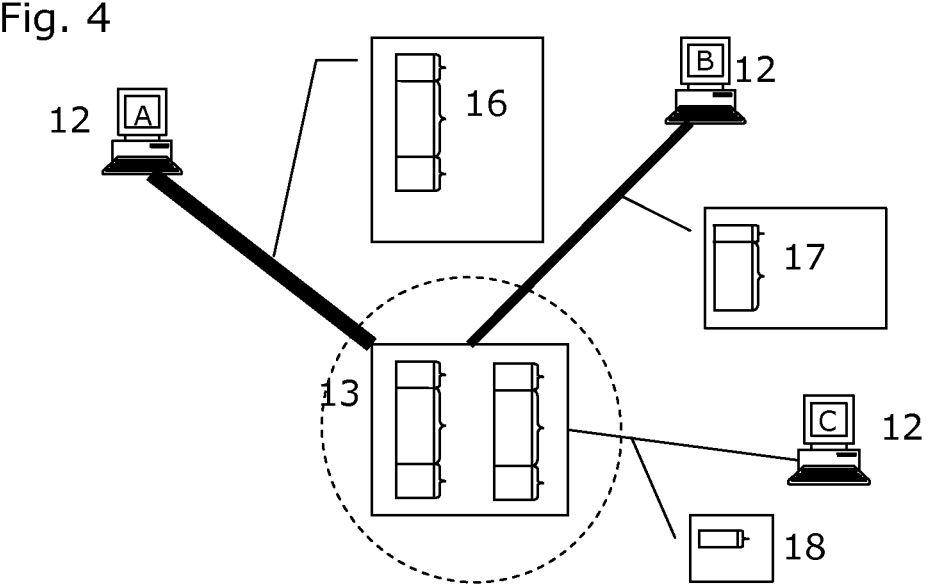
FIG. 4 illustrates an overview of a computer network having different data rates on the connections between the devices in the network. Also shown are how the different subsets may be distributed on the different connections.

FIG. 4 illustrates a somewhat different system compared to the system in FIG. 1. The figure also illustrates which subsets of the superset be sent over different connections. Each subset is associated with a connection having a different data rate. For example the thickest data connection, connecting the central system 13 with a remote terminal A, is able to transmit the whole superset 16, the slower data connection is able to transmit the first and second subset 17 to remote terminal B, and the slowest data connection is able to transmit the first subset 18 to remote terminal C. In this example the central system 13 comprises two supersets of data, however the central system may comprise 1 or more data elements, such as 3, 4, 5 and up to 15 or more such as 100, 200, 500. This is dependent on the application used.

Definitions and Acronyms

MBO—Market By Order—This type of message flow contains the order book changes that occurs in the order depth for an instrument. Each change may be represented in a message by a delta change. The external applications can use this information to build up their order depth for this order book and maintain a shadow of the real order book.

It is possible to say that only order changes that occurs on the top X levels shall be distributed, by doing so the application at the remote terminal will have a copy the order depth for those levels.

MBP—Market By Price—This type of message contains information on the price levels that exists in the market with a summary of the total volume on each level. It is possible to say that only the top Y price levels will be distributed.

ODS—Order depth snapshot—Sends out a shapshot of the original data set at specific intervals.

MB—Message Bus—Is the part of a computer system/network that handles the transaction of messages between the devices in a computer and/or network. This may include both hardware and software.

Bandwidth Improvement Methods

The following section will discuss different methods that can be used to control the amount of data that is generated and distributed by a trading system. As an example the methods can be used to improve the bandwidth utilization in a system that is having network problems.

Number of Message Flows

The simplest way to control the amount of data that is generated by a system is to limit the number of message flows that are generated. For example an exchange that wants to reduce bandwidth utilization could decide to generate and distribute the (Market By Price) MBP flow and the (Order Depth Snapshot) ODS flow or the (Market By Order) MBO flow. Preferably the following flows are used simultaneously: MBP, MBP and ODS, MBP and MBO. There is usually no need to use ODS and MBO at the same time.

Message Flow Method

The next item that has impact on the bandwidth utilization is the method that is used when the data is distributed. This will also have impact on the system performance, both from a central system point of view and from a front-end application point of view. One way of distributing information might be very effective from a bandwidth utilization perspective but at the same time be performance ineffective for the front-end application. It is therefore important to find the most effective way to distribute the information/data based on the requirements the exchange/system operators has on bandwidth utilization, performance, latency and so forth.

Taking the order depth as an example for an exchange that is only interested in distributing the top 10 best orders in an orderbook. In order for a front-end application to build up a copy of the order depth for these 10 positions it will constantly need to receive information regarding the orders in the book. This type of information can be distributed in three different ways.

Message Flow Method 1—Order Details Delta Broadcast for Each Order in the Book With this method, the information dissemination system broadcasts order details for each change that occurs on any order within the depth. One effect by this would be that the front-end application could maintain a copy of the entire order depth. This solution is directly dependent on the number of transactions coming in. However, in the case where the entire order depth must be publicly known, this may be the best method to use.

From a latency perspective this solution is efficient since no holdback timer is used and the broadcast can be generated immediately after the orderbook change occurs.

Message Flow Method 2—Order Details Delta Broadcast for Orders on the Top X Levels This method is preferably used at electronic exchanges that have a large order depth but may not be obligated to distribute the entire order depth and would like to use this fact to minimize the bandwidth utilization and only distribute orders that are located on the ranking position of interest. For example orders/quotes that are out of market will not be distributed. This model will be very useful if the exchange has members that use automatic quote machines that continuously re-quote on prices that are out of the market. This type of behaviour generates a lot messages if method 1 above were used but with method 2 it would not have the same affect on the bandwidth utilization.

With this method, the information dissemination system sends out an order details broadcast for each change that occurs on orders that are on the top X ranking positions, and the front-end application can use this information to maintain an order depth shadow of the top X orders for this order book. An example for this model could be an electronic exchange that only wants to distribute the top 10 ranking positions in order to save bandwidth. For example, if an order change (update/add/remove) occurs on position 13, it will not result in a new broadcast. However, if an order book change occurs on the 9:th position, it will result in an order details broadcast message. The change can be of type update, add, or delete.

Update:
This message type is sent out if an existing order on position 9 is changed, e.g. when the quantity is reduced.

The update can be sent out in three different ways: either, a whole new data element replacing the data element on position 9 could be sent, a minimized message that only contains the new information that should be changed in the data element could be sent, or a delta change that is added or subtracted from the parameter in the original data so as to end up at the new value of the parameter. For example if the new price in position 9 is 10 and the old price is 11, it is possible to change to 10 by either sending the whole element comprising the value 10 and some other information, or only to send the value 10 to replace 11 or to send −1 and change 11 with the delta change.

Add:
This type of message is sent when a new order is inserted on position 9. The front-end application preferably has logic that updates the ranking position in a correct way for each affected order in the order book based on the added order. For example the order that had the 9th position will get ranking position 10. The order that was stored on position 10 can now be handled in two different ways. The order is no longer one of the top 10 orders and it must therefore be removed from the front-end application display since no order updates will be sent for that order as long as it is outside the top 10. In order to remove this order from the front-end the information dissemination system could send a delete message for that order. However, from a bandwidth perspective this would not be a preferred solution since it would result in an extra message for each add when the order book has more than 10 orders. A better way of handling it could be to inform the front-end application at login of the number of orders that will be distributed for each order book. In this case, the front-end application knows that only the top ten orders will be distributed, and therefore, automatically removes the orders that get knocked out of the 10th position when new orders are added on better positions.

Delete
This type of message is sent when the order at e.g. position 9 is removed. The front-end application uses this information to delete the order from the order depth and update the ranking position number for the other orders that are affected by the delete action. In other words the order that previously had ranking position 10 will now get 9 instead.

In case an order exists on the 11th position in the central system then this order will now be moved up to the 10th position. However the front-end application will preferably not have any information regarding this order since only the top 10 has been distributed. An extra broadcast is therefore needed in order to keep the front-end application in sync with the backend system, and so the information dissemination system must send out an Add message for the order that moved from position 11 to 10. A more efficient solution is to send the data on position 11 in the same message. In this way overhead can be saved.

Preferably a holdback timer could be used in combination with this method to distribute the sum of all changes at the end of the holdback timer period. The only time less data is produced is when an order is changed more than one time within the same holdback timer period, or when several orders are added so that some of the changed orders are moved out of the top X positions before the timer expires. The advantage of this is that overhead attached to each message is minimised. This advantage is valid for the MBO broadcast. However, if the MBP information are to be distributed using this method, then there are a lot benefits of using the holdback timer logic to control broadcast distribution. The reason is that several order book changes can affect the same item in the MBP broadcast. For example, during a holdback timer interval, there can be a lot of orders that are added/changed/deleted affecting the same price level. All these changes will in that case only require one broadcast where the sum of the changes is specified, such as the resulting quantity.

Another way of configuring this method for the MBO may be to program the system so that all orders on the three best price ticks should be distributed. This type of solution requires more processor time by the front-end since a new order can result in removal of several orders. For example, when an order with a new best price is sent in, then all orders that previously were on the third best tick must be removed from the front-end application because the information dissemination system will stop sending updates for these orders since they now have price ranking four.

Message Flow Method 3—Order Depth Snapshot with Holdback Timer Functionality

This third method is based on a current value broadcast where the central system specifies the number of levels to distribute. Assume that the exchange has specified that the top 10 orders are of interest for the market. Then this broadcast preferably contains a snapshot of the order depth for the top ten orders. For example when the holdback timer expires, the information dissemination system checks if any change has occurred on the top 10 levels since the previous broadcast. If a change has occurred, a new broadcast is generated containing a snapshot of the top ten orders (even if only one order has been changed). This type of method gives the front-end application an easier API to program against, since the front-end application can use the broadcast information as it is. Thus, it does not need to have any logic that performs implicit changes/calculations such as change ranking position on existing orders based on events on other orders and so forth.

When using snapshots a holdback timer may be used in order to decide when a snapshot should be sent. For example, if a snapshot of the four uppermost data element is sent every second, the size of this message will always be the same (e.g. 4 bytes, 1 bytes per element). Another solution would be to send a data element for each update when it occurs. If during this second 100 updates occur this would result in 100 data elements a 1 byte, being sent. Thus 100 bytes are sent during the interval of one second. From a bandwidth perspective it may thus be better to use the snapshot and timer technique in this situation.

Hence this method is very useful together with holdback timer logic. However, from a bandwidth perspective it can be very demanding since the broadcast also may contain unchanged information. All 10 orders on each side will be sent out even though only one order has been changed. The method is therefore most useful when a few order levels are to be distributed in a system that receives a lot of order book changes.

Message Flow Frequency

A finer way of controlling the amount of data generated by a central system is to limit how often a message is sent out. This can be done by using holdback timer logic. Holdback timers may be divided into two categories:

Category 1

A purpose of this holdback timer method is to reduce the amount of overhead that is added onto each message that is sent over a connection. In other words this method doesn't remove any real data. The method merely holds the data for a certain period of time before it is sent over the network. By doing this, several small messages can be put together into one big message package. This saves the overhead that would have been needed for each small message.

Category 2

The purpose of this timer is to reduce the actual amount of real data that is sent over the network by only generating data at certain discrete moments in time. For the ODS message this means that the information dissemination system will generate a new message each time the timer elapses. In other words it doesn't matter if one or four hundred order book changes have occurred during the timer period, it will only result in one message. This feature will therefore reduce the actual amount of data that is sent out compared to if the ODS would be sent out each time an orderbook change occurs. The same reasoning also applies to the MBP broadcast where the system will send out a message that contains a summary of all changes that has occurred during the holdback timer period. For example if one hundred orderbook changes are received during one timer period that only affects two price levels. The system will then, at the end of the timer period, only need to generate a message that updates these two price levels with the summary of all changes. Thus, two changes are necessary instead of one hundred. The positive effect of this type of timer is that it becomes easier to calculate maximum bandwidth needed for a certain broadcast type regardless of the number of order book changes coming in to the system.

The message flow frequency method is well suited for the automated regulating feature. In high load situations the holdback timers can be increased and vice versa. The purpose of this function is to use the normal holdback timer intervals for high activity instruments (many order book changes per second) while low activity instruments preferably have a hold back timer interval that is much shorter than the normal timer (e.g., the normal timer is divided into a number of shorter intervals). An improvement is to regulate the message flow frequency based on how the current bandwidth utilization is in the system. The simplest way to accomplish this would be to just change the actual holdback timer. The timer period would then be increase during peak situations and reduced during low trading situations. This is preferably configurable so that the exchange can on each session, per message flow, specify a lower and an upper holdback timer limit. It is also preferable to have a configurable increment step time. With this feature the exchange could for example specify the holdback timer for the MBP message flow so that it has a lower limit of 200 ms and an upper limit of 400 ms with an increment step size of 100 ms. The information dissemination system process would then during low load use a holdback timer of 200 ms. In case the bandwidth utilization is about to reach its limit, then the HSMB will inform the information dissemination system about the peak situation. The information dissemination system process would then, according to a setup, increase the holdback timer from e.g., 200 ms to 300 ms as the first counter measure. If this is not sufficient for solving the bandwidth issue, the information dissemination system preferably receives a new message from the message bus and once again increases the holdback timer with another 100 ms. The new and final timer would be 400 ms. When the market moves back to a low load situation, the information dissemination system receives info about this and reduces the holdback timer accordingly. The incremental steps by which the holdback timer increases and/or decreases the timer could be set within the interval of 10 to 100 ms, such as 20 ms, 30 ms, 50 ms, 75 ms and so forth.

The method is even more effective if this functionality is combined with a "Timers in interval" function so that the increased holdback timer only affect high activity instruments using the same definition as in the normal "timers in interval" function. In the example above this would mean that the increased timer (300 ms) would only apply to the orderbooks that had one or more orderbook changes occurring during the previous interval. Low activity orderbook would still use the 200 ms.

Timers in interval function is a functionality that during normal operation extracts data from the original data set and distributes the data at a specific interval. The interval may for example be 200 ms. The 200 ms interval may be divided in, for example 5 sub-intervals, 40 ms each. Thus, if no activity occurs within the 200 ms interval, there is no need to distribute any data. However if an order is sent in to the central system, during the 200 ms interval, the system preferably distributes this change to users as soon as possible. The system could then use the timers in interval function and distribute the information at the end of the 40 ms interval wherein the order was received. At the same time, the 200 ms interval preferably starts over from the time when the order was received or registered at the central system. This functionality is very useful in relation to low activity instruments where the information should be distributed as soon as possible.

One additional feature is to classify each orderbook. By providing this classification it would be possible to configure the system so that some orderbooks are excluded by the auto regulating feature. For example these orderbooks will always have a low holdback timer even if the system goes into a peak situation. Preferably a few different info classes are defined such as A, B, C and so forth. Orderbooks connected to info class A would be the first to be affected by the auto regulating function. If this isn't enough the system would move on to info class B orderbooks and so on.

Message Flow Content

A fourth way of limiting the amount of data generated by a central system or electronic exchange is to control how large part of a message flow to generate. For example if a list of items exist in the system it is possible to control how large part of that list to distribute. This logic may for example apply to the MBO and the MBP that contains items in a sorted or prioritized list. The exchange can chose to distribute the top 5 price levels for the MBP flow and the top 10 orders in the MBO flow in order to limit the bandwidth utilization caused by the information dissemination system.

Figure 5:
FIG. 5 illustrates an example how the flow Market By Intelligens (MBI) may be created from an MBO and an MBP flow.

As illustrated in FIG. 5 an MBI flow can be created from an MBP and an MBO flow. The MBI flow comprises a certain number of MBO elements and a certain number of MBP elements. The distribution of MBO and MBP elements is preferably decided by a user what they want to see, but may also depending on the load on the line.

Thus, during peak situations it would be possible to reduce the number of levels that are distributed in a message flow. For example instead of sending out the MBO for the entire order depth the information dissemination system could go into a state where it only distributes the top 20 orders on each side.

As for the holdback timer the information dissemination system should preferably have the possibility to configure an upper and a lower limit together with an incremental step size. The upper limit would then specify the number of levels to distribute under normal load while the lower limit specifies the minimum number levels to distribute during heavy load situations. The incremental step sizes would be used in the same way as for the holdback timer, for example to control how large each regulating step shall be. By implementing this feature it is possible for the information dissemination system to for example specify a lower limit of 5 and an upper limit of 10 for the MBP message flow with an increment of 2. This would mean that the information dissemination system process sends out changes on the top 10 level during normal trading load. In case a peak situation occurs it would reduce the number of levels to distribute for example down to 8 and 6 and then finally 5 or even further. When the market goes back into a normal state the information dissemination system process will increase the levels to distribute back to its high value. In order to accomplish this it preferably receives input information from the message bus indicating low bandwidth utilization as well.

A transition from one level to another may be handled by the information dissemination system process so that external API clients can adapt to the new level. For example if the MBP is distributed using delta update messages a reduction of levels should be indicated with a new message. The message will inform external API-clients that the system goes from distributing 10 levels to 8 instead. This will cause the external applications to delete all price levels below 8 since it will no longer receive any updates on theses levels. If the system on the other hand goes from 8 to 10 levels it will need to send out info regarding this plus add messages on the 2 new levels that the external applications are missing. This is only an example on how this can be handled for one type of message. Preferably the transition solution is defined for each type of message flow based on which method that is used when the message flow is distributed.

The information dissemination solution that is described in this document can be used for many different types of data. The solution can be used in all cases where you have a list of items and there are users that are interested in different parts of the list and you would like to distribute the list in real time in the efficient way without duplicating any messages.

In order to minimize the bandwidth utilization on a network connection it is important to only send out data that concerns the remote terminals on the other end of the connection. It is therefore important for the information dissemination system to mark each message in a way that makes it possible for the message bus to determine, for each message and each connection, if the message should be sent out over the connection or not. For example a remote terminal should be able to setup which message flows that are of interest for the remote terminal. Furthermore the remote terminal should preferably only receive information that concerns order books that the remote terminal is allowed to act in.

A next level of filtering would be for the user to setup subscription on how large part of a message flow he is interested in. For example if he only is interested in the 5 top orders in the MBO even though the entire order depth is distributed.

Adaptive Information Dissemination

In the following section, a model uses available system resources and utilizes available bandwidth in an adaptive and optimized way so that the information dissemination system controls its network outflow based on an infrastructure load in the system. In other words the system may react to current bandwidth/performance situations so that the amount of data generated by the central system preferably does not exceed available bandwidth in peak situations. On the other hand, the information dissemination system process is not limited in its generation of information, by e.g., holdback timers, during low activity situations.

The determiner preferably provides the information dissemination system with information on infrastructure load such as the current bandwidth utilization in the system so that the information dissemination system can use this information to automatically control its network outflow using the methods described above.

The following section discusses how the methods described above preferably are used in an adaptive way in order to control the network outflow from the information dissemination system based on the current infrastructure load situation in the system, such as performance/bandwidth.

Number of Message Flows

This method may be used for an automatic regulating feature. Which message flows to generate are preferably controlled based on the session. During a trading day an exchange may be in different session states, for example the exchange may be pre-open, open, closed, open 2, night and so forth. The traffic in the system may be different depending on which session it is. Hence, it is preferred that the exchange, for each session, specifies what type of information it would like to distribute. The MBP might be sufficient in one session while another session requires both the MBP and the MBO message flows to be distributed or ODS messages.

Furthermore a remote terminal may want to receive data relating to different orderbooks, for example half of the data is stored in the "background" but not shown, when the remote terminal switches orderbook the data is already stored at the remote terminal and there is no need for requesting new data for the other orderbook. Thus an option is to only download the data that will be used.

The exchange could also define a special session for peak situations. This session should only have the most important message flows enabled. In case the system goes into a peak situation and the automatic regulating features aren't enough to hinder the network traffic to exceed the available bandwidth, then the exchange's market control function may move the market place into the peak session and thereby disable the message flows that aren't absolutely necessary. This can be done automatically or manually.

When implementing this auto-regulating feature, a delaying factor may be employed. The delaying factor hinders the auto function from fluctuating when the bandwidth utilization is near its limit. The feature preferably should not change the behaviour back and forth in a rapid pace. This may be done by use of at least one of the following techniques. Either a certain time has to pass before the auto-regulating feature is able to change the extraction and distribution of data, or upper and lower thresholds are defined. For example, an upper threshold may be defined as 90% of the data rate, and a lower threshold could be 80% of the data rate. When the data rate exceeds 90%, the auto-regulating feature cuts back the extraction and/or distribution of data. When the data rate goes below 70% of the total bandwidth, the auto-regulating feature may increase the extraction and/or distribution of data. Other threshold values may be used such as 80%/70%, 95%/85&, 90/80%, 100%/70% and so forth.

The technology described above keeps the data rate at a certain level or within certain levels. However, as a precaution, a back pressure function may start when the load exceeds a certain level that the auto-regulating feature can not handle. Thus, at a certain load, it may be better to let the back pressure feature control the system performance by hindering the source of the incoming data from sending in more data than the system can handle.

In the above description the term "comprising" does not exclude other elements or steps and "a" or "an" does not exclude a plurality.

Furthermore the terms "include" and "contain" does not exclude other elements or steps.

The invention claimed is:

1. A computer system for making available one or more data sets to a plurality of remote user terminals via a communications network, the computer system comprising:
 a memory configured to store a first set of data including one or more elements, wherein the one or more elements in the first set of data are data processing requests or data processing execution results input or generated by the computer system, and computer hardware, coupled to the memory, configured to:
 determine an information dissemination load associated with operation of the computer system to disseminate a message to the plurality of remote user terminals via the communications network based on one or more of:
   bandwidth utilization over one or more parts of the communications network,
   latency associated with a time from sending a data message to receiving an acknowledge message, or
   speed of data processing performance;
 filter the first set of data to extract, based on the information dissemination load associated with the computer system, a second set of data from the first set of data, thereby leaving a remaining set of data, wherein:
   the second set of data includes one or more elements,
   the one or more elements in the second set of data are data processing requests or data processing execution results input or generated by the computer system,
   the remaining set of data includes one or more elements, and
   the one or more elements in the remaining set of data are data processing requests or data processing execution results input or generated by the computer system; and
 transmit electronic messages over the communications network to the plurality of remote user terminals, wherein:
   the transmitted electronic messages contain the second set of data but do not contain the remaining set of data, and
   the computer hardware is configured to control a frequency at which the electronic messages containing the second set of data are transmitted over the communications network based on the information dissemination load associated with the computer system so that the electronic messages containing the second set of data are transmitted more frequently over the communications network when the information dissemination load associated with the computer system is below a first load level and the electronic messages containing the second set of data are transmitted less frequently over the communications network when the information dissemination load associated with the computer system is at or above the first load level.

2. The computer system according to claim 1, wherein the computer hardware is configured to adjust the second set of data.

3. The computer system according to claim 1, wherein the computer hardware includes a holdback timer configured to control the frequency at which the electronic messages containing the second set of data are transmitted over the communications network.

4. The computer system according to claim 1, wherein the computer hardware is configured to sort content of the second set of data.

5. The computer system according to claim 1, wherein the computer hardware is configured to classify a type of the second set of data into different categories.

6. The computer system according to claim 1, wherein the computer hardware is configured to:
 determine different information dissemination load conditions associated with different ones of the plurality of remote user terminals,
 extract different second sets of data from the first set of data, and
 transmit electronic messages containing the extracted different second sets of data to different ones of the plurality of remote user terminals in accordance with their determined corresponding different information dissemination load conditions.

7. A method implemented on a computer system for making available one or more data sets of data processing requests or data processing execution results input or generated by the computer system to a plurality of remote user terminals via a communications network, the method comprising the steps of:
 storing a first set of data including one or more elements, wherein the one or more elements in the first set of data are data processing requests or data processing execution results input or generated by the computer system;
 determining, by the computer system, an information dissemination load associated with operation of the computer system to disseminate a message to the plurality of remote user terminals via the communications network based on one or more of:
  bandwidth utilization over one or more parts of the communications network,
  latency associated with a time from sending a data message to receiving an acknowledge message, or
  speed of data processing performance;
 filtering the first set of data to extract, based on the information dissemination load associated with the computer system, a second set of data from the first set of data, thereby leaving a remaining set of data, wherein:
  the second set of data includes one or more elements,
  the one or more elements in the second set of data are data processing requests or data processing execution results input or generated by the computer system,
  the remaining set of data includes one or more elements, and
  the one or more elements in the remaining set of data are data processing requests or data processing execution results input or generated by the computer system; and
 transmitting electronic messages over the communications network to the plurality of remote user terminals, wherein:
  the transmitted electronic messages contain the second set of data but do not contain the remaining set of data, and
  a frequency at which the electronic messages containing the second set of data are transmitted over the communications network is based on the information dissemination load associated with the computer system so that the electronic messages containing the second set of data are transmitted more frequently over the communications network when the information dissemination load associated with the computer system is below a first load level and the electronic messages containing the second set of data are transmitted less frequently over the communications network when the information dissemination load associated with the computer system is at or above the first load level.

8. The method according to claim 7, wherein the determining step includes determining different infrastructure conditions corresponding to different ones of the plurality of remote user terminals, wherein the extracting step includes selectively extracting different second sets of data from the first set of data, and the transmitting step includes selectively transmitting messages containing the extracted different second set of data to different ones of the plurality of remote user terminals in accordance with their determined corresponding different infrastructure conditions.

9. The method according to claim 7, further comprising using a holdback timer to control the frequency of transmission of the electronic messages containing the second set of data.

10. The method according to claim 7, further comprising sorting content of the second set of data.

11. The method according to claim 7, further comprising classifying a type of the second set of data.

12. A non-transitory, computer-readable storage medium storing a computer program which when executed by a computer in a computer system causes the computer system to:
 store in a memory a first set of data including one or more elements, wherein the one or more elements in the first set of data are data processing requests or data processing execution results input or generated by the computer system,
 determine an information dissemination load associated with operation of the computer system to disseminate a message to a plurality of remote user terminals via a communications network based on one or more of:
  bandwidth utilization over one or more parts of the communications network,
  latency associated with a time from sending a data message to receiving an acknowledge message, or
  speed of data processing performance;
 filter the first set of data to extract, based on the information dissemination load associated with the computer system, a second set of data from the first set of data, thereby leaving a remaining set of data, wherein:
  the second set of data includes one or more elements,
  the one or more elements in the second set of data are data processing requests or data processing execution results input or generated by the computer system,
  the remaining set of data includes one or more elements, and
  the one or more elements in the remaining set of data are data processing requests or data processing execution results input or generated by the computer system;
 transmit electronic messages over a communications network to a plurality of remote user terminals, wherein:
  the transmitted electronic messages contain the second set of data but do not contain the remaining set of data, and a frequency at which the electronic messages containing the second set of data are transmitted over the communications network is based on the information dissemination load associated with the computer system so that the electronic messages containing the second set of data are transmitted more frequently over the communications network when the information dissemination load associated with the computer system is below a first load level and the electronic messages containing the second set of data are transmitted less frequently over the communications network when the information dissemination load associated with the computer system is at or above the first load level.

\* \* \* \* \*